United States Patent
Sun et al.

[11] Patent Number: 5,878,986
[45] Date of Patent: *Mar. 9, 1999

[54] POPOUT STORAGE AND CUPHOLDER ASSEMBLY

[75] Inventors: Andy Kwan-Leung Sun, North York; Bruce H.B. Chow, Scarborough; Edoardo Panziera, Maple, all of Canada

[73] Assignee: Collins & Aikman Plastics, Inc., Troy, Mich.

[*] Notice: The term of this patent shall not extend beyond the expiration date of Pat. No. 5,702,041.

[21] Appl. No.: 909,903

[22] Filed: Aug. 12, 1997

Related U.S. Application Data

[63] Continuation of Ser. No. 617,054, Mar. 18, 1996, Pat. No. 5,702,041.

[51] Int. Cl.⁶ .............................. A47K 1/08; B60R 7/00
[52] U.S. Cl. .................. 248/311.2; 224/539; 224/926
[58] Field of Search .................. 248/311.2, 310, 248/314, 316.8; 224/539, 926; 297/188.01

[56] References Cited

U.S. PATENT DOCUMENTS

| | | | |
|---|---|---|---|
| D. 359,266 | 6/1995 | Karp et al. | D12/419 |
| 3,223,280 | 12/1965 | Kazimer | 206/203 |
| 3,454,156 | 7/1969 | Chatten | 206/160 |
| 4,438,637 | 3/1984 | Atkinson | 62/457.5 |
| 4,718,555 | 1/1988 | Amberg | 206/564 |
| 4,747,274 | 5/1988 | Duemmig-Zitzmann | 62/371 |
| 4,919,381 | 4/1990 | Buist | 248/311.2 |
| 5,044,577 | 9/1991 | Spearman | 224/544 |
| 5,052,649 | 10/1991 | Hunnicut | 248/311.2 |
| 5,104,182 | 4/1992 | Rasnick et al. | 297/113 |
| 5,108,059 | 4/1992 | Curtis | 248/311.2 |
| 5,150,946 | 9/1992 | Marfilius et al. | 297/188.15 |
| 5,170,980 | 12/1992 | Burrows et al. | 248/311.2 |
| 5,246,269 | 9/1993 | DeBoer et al. | 297/227 |
| 5,253,838 | 10/1993 | Spykerman | 248/311.2 |
| 5,280,848 | 1/1994 | Moore | 224/282 |
| 5,280,870 | 1/1994 | Chick et al. | 224/926 |
| 5,297,709 | 3/1994 | Dykstra et al. | 224/281 |
| 5,330,146 | 7/1994 | Spkerman | 248/311.2 |
| 5,337,984 | 8/1994 | Houck | 248/146 |
| 5,505,417 | 4/1996 | Plocher | 224/926 |
| 5,509,633 | 4/1996 | Ruster et al. | 224/926 |
| 5,522,239 | 6/1996 | Schwartz et al. | 62/457.4 |
| 5,533,700 | 7/1996 | Porter | 224/926 |
| 5,628,441 | 5/1997 | Dykstra | 224/483 |
| 5,634,621 | 6/1997 | Jankovic | 248/311.2 |
| 5,702,041 | 12/1997 | Sun et al. | 224/539 |

*Primary Examiner*—Ramon O. Ramirez
*Assistant Examiner*—Anita M. King
*Attorney, Agent, or Firm*—Bliss McGlynn, P.C.

[57] ABSTRACT

A cupholder assembly (10) includes a housing (14) with three intersecting circular cavities (16,18,20) formed therein. The outer two cavities (16,20) may act as receptacles for containers (12). The center cavity (18) includes a removable insert member (30) positioned therein. The insert member (30) includes pivotable arms (42) extending therefrom into the first and third cavities (16,20) to bias containers (12) of varying sizes against their respective cavity (16,20). The insert member (30) may be removed for use of the center cavities (16,18,20) as a storage compartment.

26 Claims, 2 Drawing Sheets

POPOUT STORAGE AND CUPHOLDER ASSEMBLY

This is a continuation of U.S. patent application Ser. No. 08/617,054, filed Mar. 18, 1996 now U.S. Pat. No. 5,702,041.

BACKGROUND OF THE INVENTION

1. Field of the Invention

The present invention relates generally to cupholder assemblies for holding containers, and more particularly those adapted to be used in vehicles.

2. Description of the Related Art

There is a demand to provide cupholders in vehicles and other seating applications. Cupholders have been located in the center console or arm rest, floor console, and instrument panel. It is also been desirable to provide a cupholder with multiple cavities to receive multiple containers. Furthermore, it has been become important to allow for containers of different sizes to be received in the same cup holder.

U.S. Pat. No. 5,280,848 issued Jan. 25, 1994 in the name of Moore discloses two intersecting circular cavities establishing a pair of container holders.

U.S. Pat. No. 5,337,984 issued Aug. 16, 1994 in the name of Houck discloses a cupholder assembly having multiple apertures formed therein to receive multiple containers. Each of the apertures or container holders are separate from each other.

U.S. Pat. No. 5,150,946 issued Sept. 29, 1992 in the name of Marfilius et al. discloses a pair of intersecting cavities for receiving containers.

U.S. Pat. No. 5,253,838 issued Oct. 19, 1993 in the name of Spykerman discloses an elongated cavity having arcuate cutouts formed on one side to establish the areas for two containers.

U.S. Pat. No. 5,246,269 issued Sept. 21, 1993 in the name of DeDoer et al. discloses two intersecting container holders or receptacles.

U.S. Pat. No. 5,170,980 issued Dec. 15, 1992 in the name of Burrows et al. discloses an enlarged cavity with pivotable arcuate sides to establish separate container holders.

None of the prior art references disclose cupholders formed with a removable insert therebetween which forms a side of the receptacles.

SUMMARY OF THE INVENTION

The invention is a cupholder assembly which comprises a support housing. The support housing includes at least two interconnecting cavities, a first of the cavities providing a first receptacle for a container. An insert member is removeably received within a second of the cavities and fills at least a portion of the second cavity. The insert member includes a first surface providing a portion of the first receptacle when positioned in the second cavity.

The invention also includes the support housing including at least three interconnecting cavities wherein two of the cavities provide receptacles for containers. The remaining of the cavities include an insert member releasably secured therein filling a portion of the cavity.

The invention also includes a pivotable arm pivotally connected to the support surface of the support housing and extending outwardly into the first receptacle to provide support against the container at various outward positions.

BRIEF DESCRIPTION OF THE DRAWINGS

Advantages of the subject invention will be readily appreciated as the same becomes better understood by reference to the following detailed description when considered with the accompanying drawings wherein.

DESCRIPTION OF THE PREFERRED EMBODIMENT(S)

Figure 1:
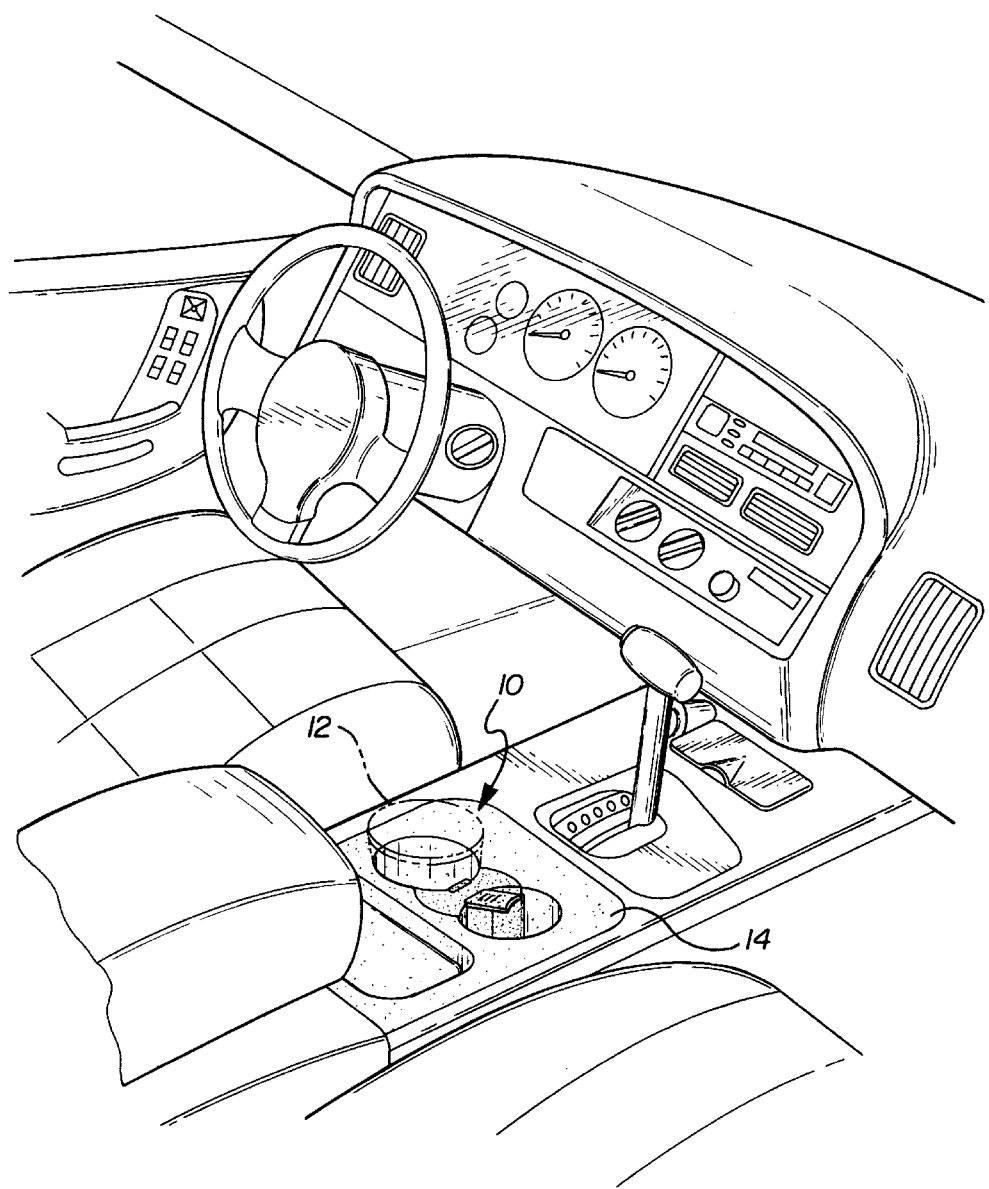
FIG. 1 is a general perspective view of the cupholder assembly in a vehicle.
Figure 2:
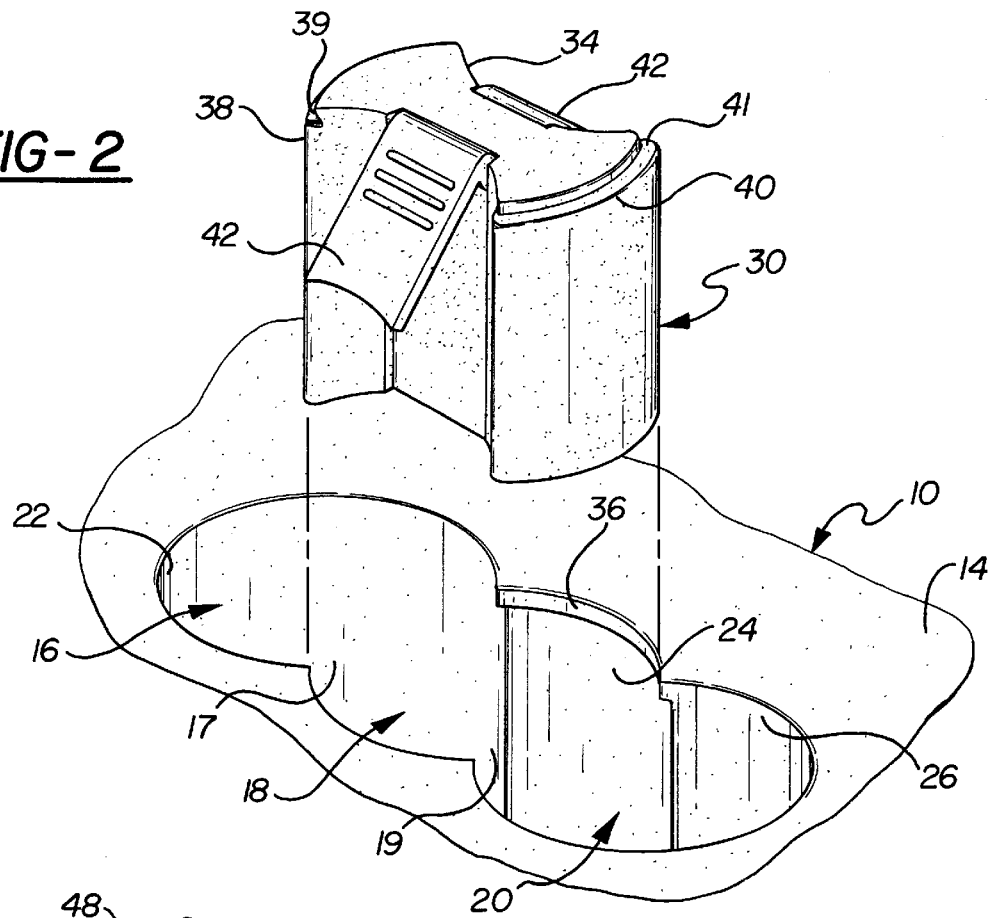
FIG. 2 is a perspective view of the insert member being removed from the support housing.
Figure 3:
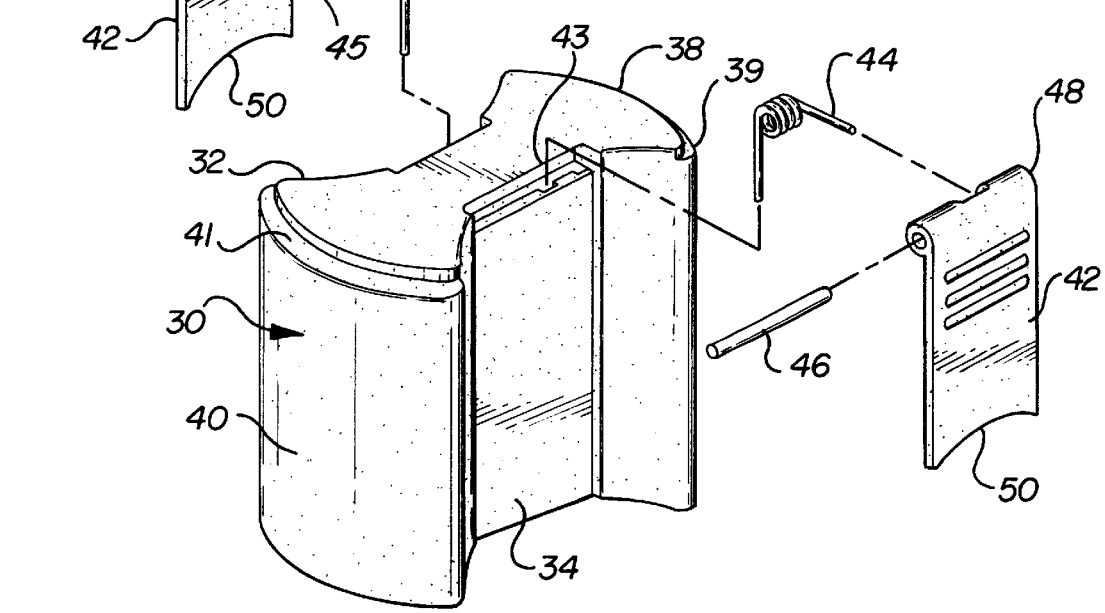
FIG. 3 is an exploded view of the insert member.

A cupholder assembly 10 is generally illustrated in FIG. 1 and more particularly in FIGS. 2–3. The cupholder assembly 10 can support a plurality of containers or cups 12. Though the cupholder assembly 10 is illustrated for use in a vehicle, it is to be understood that the cupholder assembly 10 may be utilized in other applications based on the teachings of this invention.

The cupholder assembly 10 includes a support housing 14. The support housing 14 includes first, second, and third cavities 16,18,20 formed therein. Each of the first, second and third cavities 16,18,20 are generally cylindrical in shape whose circumferences intersect with one another thereby providing gaps or channels 17,19 between the cavities 16,18,20. More particularly, each of the cavities 16,18,20 includes at least a partial perimeter wall 22,24,26. The perimeter walls 22,24,26 are of circular contour to support the containers 12 of various contours.

The cupholder assembly 10 also includes an insert member 30 removeably received within the second cavity 18 and filling or extending at least a portion of the second cavity 18. The insert member 30 includes first and second sides 32,34 which provide portions of the first and third cavities 16,20 or receptacles, respectively, to support containers 12 therein. In the preferred embodiment, the first and second sides 32,34 are arcuate in shape and concave to complement the circular contour of the perimeter walls 22,26. The insert member 30 is also generally cylindrical in shape to securely fit within the second cavity 18 to allow rotational movement of the insert member 30 therein. The first and second sides 32,34 are cut out of the cylindrical shape.

The insert member 30 is releasably secured within the second cavity 18. The insert member 30 may be removed from the second cavity 18 to allow use of the second cavity 18 as an open storage compartment. The support housing 14 includes a lip 36 overhanging the second cavity 18. The insert member 30 includes outer ends 38,40 with the first and second sides 32,34 extending therebetween. The outer ends 38,40 are placed adjacent the perimeter walls 24 of the second cavity 18 when inserted therein. The lip 36 over hangs the walls 24 to lock and secure the outer ends 38,40 thereto. The insert member 30 can be rotated within the second cavity 18 so that the outer ends 38,40 are moved toward the first and third cavities 16,20 to disengage the lip 36 (FIG. 2) so that the insert member 30 can be removed. The outer ends 38,40 include a shoulder 39,41 formed at the upper edge thereof to be locked by the lip 36 preventing removal of the insert member 30, and so that the upper surface of the insert member 30 is flushed with the support housing 14.

The insert member 30 also includes a pair of pivotable support arms 42 extending outwardly from each of the center area of the first and second sides 32,34 into the first and third cavities 16,20 to provide biased support against the container 12 at various angular positions. The arms 42 are connected to the insert member 30 by biasing members 44, typically a spring, to allow the arm 42 to be biased into the first and second cavity 16,20 and resiliently repositioned depending on the size of the container 12 disposed therein. The biasing member 44 is connected to the arm 42 by a pin 46 threaded through a tubular portion 48 on the pivoting end of each arm 42. An arm channel 45 is formed by a pair of molded pins to hold the spring end stationary. The other end of the biasing member 42 is connected within a channel 43 of the insert member 30. The arms 42 include an outward end 50 having an arcuate or concave shape to complement circular containers 12. The arms 42 in their fully biased positions extend outwardly into the receptacles provided by the first and third cavities 16,20 approximately at a 90 degree angle. The arms 42 may be pivoted further downwardly between the 90 degree angle to 0 degree adjacent the first and second sides 32,34. This allows biasing against the container 12 (of different size) within the cavities 16,20 to prevent movement or rattling of the container 12 therein. Containers 12 of different sizes can therefore be used.

In operation, a user may insert containers 12 in any of the first or third cavities 16,20 when the insert member 30 is positioned in the second cavity 18. If a user desires to use an open storage compartment, the insert member 20 is removed by rotating the insert member 30 approximately 90° so that the lip 36 is disengaged by the insert member 30. Thereafter, the insert member 30 is pulled out of the second or center cavity 18. Items may be placed in all of the cavities 16,18,20. The insert member 30 may be replaced by again inserting the member 30 in the second cavity 18 with the ends 38,40 extending in the first and third cavities 16,20. Thereafter the insert member 30 is rotated 90° to lock with the lip 36.

The cupholder assembly 10 may be molded of rigid plastic by any suitable process, excluding the spring 44. It is to be appreciated that other materials may be used.

It should also be understood that, though the assembly 10 is illustrated for use in a center floor console, that the assembly 10 may be used in any location or application.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle cupholder assembly comprising:

a support housing adapted to be fixedly secured within a vehicle;

said support housing including at least two side-by-side interconnecting cavities, a first of said cavities providing a first receptacle for a container;

an insert member removably received within a second of said cavities and which extends within at least a portion of said second cavity, and including a first insert side providing a portion of said first receptacle for supporting the container when positioned in said first cavity;

said support housing includes a locking member interconnectable with said insert member for securing said insert member into said second cavity in a latch position and for allowing removal of said insert member in an unlatch position; and said locking member includes a lip permanently and fixedly secured in said support housing for engaging said insert member when in said latch position allowing the container to be removed or placed with said first receptacle.

2. A vehicle cupholder assembly as set forth in claim 1, further including a third cavity interconnecting said second cavity, said third cavity providing a second receptacle for a container.

3. A vehicle cupholder assembly as set forth in claim 2, wherein said first cavity includes at least a first partial perimeter wall of circular contour.

4. A vehicle cupholder assembly as set forth in claim 3, wherein said first insert side is of arcuate contour complementing said first partial perimeter wall.

5. A vehicle cupholder assembly as set forth in claim 4, wherein said insert member includes a second side establishing a portion of said second insert receptacle.

6. A vehicle cupholder assembly as set forth in claim 5, wherein said second cavity includes at least a second partial perimeter wall of circular contour.

7. A vehicle cupholder assembly as set forth in claim 6, wherein said second insert side is of arcuate contour complimenting said second partial perimeter wall.

8. A vehicle cupholder assembly as set forth in claim 4, wherein said insert member includes a biasing arm extending outwardly from said insert member at said first side to contact the container placed within said first receptacle.

9. A vehicle cupholder assembly as set forth in claim 8, wherein said insert member includes a biasing member interconnecting said biasing arm to said insert member to allow said biasing arm to be biased into said first receptacle and resiliently repositioned depending on the size of the container.

10. A vehicle cupholder assembly as set forth in claim 1, wherein said insert member includes outer ends with said first insert side extending therebetween, said outer ends adjacent walls of said second cavity.

11. A cupholder assembly comprising:

a support housing;

said support housing including at least two side-by-side interconnecting cavities, a first of said cavities providing at least one receptacle for a container, said first cavity defining a perimeter wall;

an insert member releasably secured within a second of said cavities and which extends about a substantial portion of said second cavity and including a first insert side providing a supporting portion of said first cavity for the container therein;

said insert member including a biasing arm extending outwardly from said insert member at said first side to contact a container placed within said first receptacle.

12. A cupholder assembly as set forth in claim 11, wherein said insert member includes a biasing member interconnecting said biasing arm to said insert member to allow said biasing arm to be biased into said first receptacle and resiliently repositioned depending on the size of the container.

13. A cupholder assembly as set forth in claim 12, wherein said support housing includes a locking member interconnectable with said insert member, said insert member being rotatable within said second cavity between a latch position fixedly securing said first insert member into said second cavity with said insert side forming a portion of said receptacle and an unlatch position allowing removal of said insert member.

14. A cupholder assembly as set forth in claim 13, wherein said first insert member includes outer ends with said insert side extending therebetween, said outer ends adjacent walls of said second cavity;

said locking member includes a lip on said support housing overhanging said second cavity and outer ends of said insert when in said latch position.

15. A cupholder assembly as set forth in claim 11, wherein said first insert side is of arcuate contour complementing said perimeter wall and provides a portion of said first receptacle for the container when positioned in said second cavity in said latch position.

16. A cupholder assembly as set forth in claim 15, wherein said insert member includes a second side establishing a portion of said second receptacle;

said first cavity includes at least a partial perimeter wall of circular contour.

17. A cupholder assembly as set forth in claim 11 wherein said insert member includes at least one convex side to provide said first insert side.

18. A cupholder assembly comprising:

a support housing;

said support housing including at least two side-by-side cavities, a first cavity providing a first receptacle for a container and a second cavity interconnecting said first cavity, said first receptacle including support surfaces for supporting the container;

an insert member removably received within said second cavity and which extends through a substantial portion of said second cavity, said insert member defining two insert sides;

said support housing including a locking member fixedly secured on said support housing which interacts with said insert member to fixedly secure said insert member into said second cavity in a latch position with said sides forming a portion of said receptacles and allowing removal of said insert member in an unlatch position whereby the container may be freely removed and placed in said first receptacle while said insert member is latched within said second cavity.

19. A cupholder as set forth in claim 18, wherein said locking member interconnecting with said insert member, said insert member being rotatable within said second cavity between said latch position and said unlatch position allowing removal of said insert member.

20. A cupholder assembly as set forth in claim 19, wherein said insert member includes outer ends with said insert sides extending therebetween, said outer ends adjacent walls of said second cavity;

said locking member includes a lip on said support housing overhanging said second cavity and outer ends of said insert when in said latch position.

21. A cupholder assembly as set forth in claim 18, further including a pivotal arm pivotally connected to said support surface and extending outwardly into said receptacle to provide support against a container at various outward positions wherein said pivotal arm includes a biasing spring interconnecting said arm and said insert member.

22. A cupholder assembly as set forth in claim 21, wherein said arm extends in a downward and outward direction and can be biased downwardly.

23. A cupholder assembly comprising:

a support housing;

said support housing including at least two side-by-side interconnecting cavities, a first of said cavities providing a receptacle for a container;

an insert member releasably secured and rotatable within a second of said cavities and which extends a substantial portion of said second cavity and including a first side providing a supporting portion of said first cavity receiving the container so that said insert member remains within said first cavity while a container is freely removed or placed in said first cavity and said first cavity supports the container with said insert member in said latch position or said unlatch position.

24. A cupholder assembly as set forth in claim 23, wherein said insert member includes opposing outer ends complimenting perimeter shape within said second cavity.

25. A cupholder assembly as set forth in claim 24, wherein said second cavity includes substantially arcuate perimeter walls, said opposing outer ends being of arcuate shape.

26. A cupholder assembly as set forth in claim 25, wherein said insert member includes at least one concave side extending between said outer ends forming a portion of said first cavity.

* * * * *

UNITED STATES PATENT AND TRADEMARK OFFICE
CERTIFICATE OF CORRECTION

PATENT NO. : 5,878,986
DATED : March 9, 1999
INVENTOR(S) : Andy Kwan-Leung Sun et al.

It is certified that error appears in the above-identified patent and that said Letters Patent is hereby corrected as shown below:

Column 1, line 20, please delete "been".

Column 4, line 55, please delete "first".

Column 4, line 62, please delete "first".

Column 4, line 63, before "insert" please insert --first--.

Column 4, line 67, please delete "first".

Column 4, line 67, before "insert" (second occurrence), please insert --first--.

Column 5, line 13, please delete "receptacle" and insert therefor --cavity--.

UNITED STATES PATENT AND TRADEMARK OFFICE
CERTIFICATE OF CORRECTION

PATENT NO. : 5,878,986
DATED : March 9, 1999
INVENTOR(S) : Andy Kwan-Leung Sun et al.

It is certified that error appears in the above-indentified patent and that said Letters Patent is hereby corrected as shown below:

Column 5, line 41, please delete "interconnecting" and insert therefor --interconnects--.

Signed and Sealed this

Fifth Day of October, 1999

Attest:

Q. TODD DICKINSON

Attesting Officer

Acting Commissioner of Patents and Trademarks